(12) United States Patent
Allen

(10) Patent No.: US 12,524,333 B2
(45) Date of Patent: *Jan. 13, 2026

(54) FUNCTIONALITY TEST OF A COMPONENT FOR USE DURING A VIDEO CONFERENCE

(71) Applicant: Zoom Communications, Inc., San Jose, CA (US)

(72) Inventor: Reed Hunter Allen, Medford, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,183

(22) Filed: May 2, 2024

(65) Prior Publication Data

US 2025/0343877 A1 Nov. 6, 2025

Related U.S. Application Data

(63) Continuation of application No. 17/840,051, filed on Jun. 14, 2022, now Pat. No. 12,007,882.

(51) Int. Cl.
*H04N 7/15* (2006.01)
*G06F 11/22* (2006.01)
*G06F 11/27* (2006.01)

(52) U.S. Cl.
CPC ........... *H04N 7/15* (2013.01); *G06F 11/2257* (2013.01); *G06F 11/27* (2013.01)

(58) Field of Classification Search
CPC ....... G06F 11/2257; G06F 11/27; H04N 7/15; H04L 65/403
See application file for complete search history.

(56) References Cited

U.S. PATENT DOCUMENTS

| | | | |
|---|---|---|---|
| 8,441,516 B2* | 5/2013 | Satyanarayanan | H04L 12/1822 348/14.09 |
| 8,614,735 B2 | 12/2013 | Buckler | |
| 8,711,202 B2* | 4/2014 | Ranganath | H04N 7/15 709/224 |
| 9,894,322 B1* | 2/2018 | Liao | H04N 7/15 |
| 10,216,514 B2 | 2/2019 | Wilkinson | |
| 10,484,386 B2 | 11/2019 | Storr | |
| 2009/0106419 A1 | 4/2009 | Tierney et al. | |
| 2011/0050840 A1 | 3/2011 | Ryu et al. | |
| 2018/0084107 A1 | 3/2018 | Aggarwal et al. | |
| 2019/0141289 A1 | 5/2019 | Rosenberg | |

(Continued)

OTHER PUBLICATIONS

Joining a Zoom test meeting—Zoom Support, https://support.zoom.us/hc/en-us/articles/115002262083-Joining-a-Zoom-test-meeting, Dec. 15, 2021, 2 pages.

(Continued)

*Primary Examiner* — Joseph R Kudirka
(74) *Attorney, Agent, or Firm* — Young Basile Hanlon & MacFarlane, P.C.

(57) ABSTRACT

A processing system may execute diagnostic software to test the functionality of one or more components arranged in a physical space for use during a video conference. Functionality of the diagnostic software may include detecting that the component is in a limited condition for use during the video conference. The processing system may initiate a response, based on an output of the diagnostic software, to change the condition of the component to increase the functionality of the component.

20 Claims, 10 Drawing Sheets

(56) References Cited

U.S. PATENT DOCUMENTS

2020/0112600 A1* 4/2020 Hodgkinson ......... H04L 1/0047
2021/0360192 A1 11/2021 Cranfill et al.
2023/0188407 A1* 6/2023 Mohite .................... H04N 7/15
   709/204
2023/0247077 A1* 8/2023 Yu ......................... H04L 65/403
   348/14.03

OTHER PUBLICATIONS

Testing your video—Zoom Support, https://support.zoom.us/hc/en-us/articles/201362313-Testing-your-video, Dec. 10, 2021, 3 pages.
Testing audio before Zoom Meetings—Zoom Support, https://support.zoom.us/hc/en-us/articles/201362283-Testing-audio-before-Zoom-Meetings, Dec. 22, 2021, 4 pages.

* cited by examiner

FUNCTIONALITY TEST OF A COMPONENT FOR USE DURING A VIDEO CONFERENCE

CROSS-REFERENCE TO RELATED APPLICATION(S)

This application is a continuation of U.S. patent application Ser. No. 17/840,051, filed Jun. 14, 2022, the entire disclosure of which is hereby incorporated by reference.

FIELD

This disclosure relates generally to video conferencing and, more specifically, to executing diagnostic software to test the functionality of a component for use during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
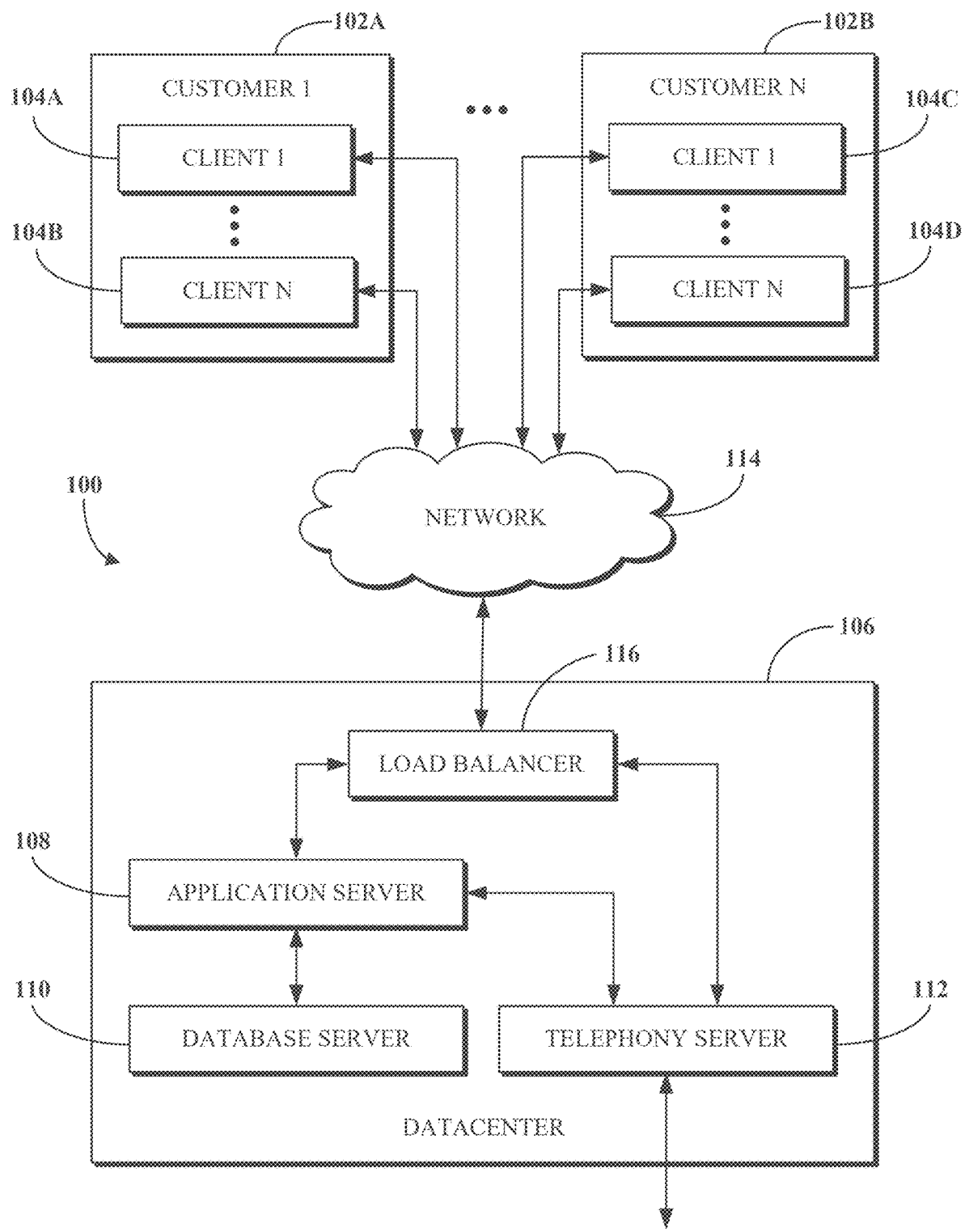
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a software platform such as a unified communications as a service (UCaaS) platform, which includes several communications services integrated over a network, such as the Internet, to deliver a complete communication experience regardless of physical location.

Conferencing software, such as that of a UCaaS platform, may in particular permit video conferencing between participants at different locations. A participant of a video conference may use various hardware and software components when participating in the conference. For example, the hardware components may include cameras, microphones, speakers, lights, input interfaces, output interfaces, digital whiteboards, and/or computers. In another example, the software components may include video conferencing software, software or firmware controlling the functionality of hardware, and/or user settings. The components may be provided in a physical space (e.g., a classroom, a conference room, or other meeting room), and in some cases may be shared with other participants of other conferences at different times.

In some cases, one or more of the hardware and/or software components used within the physical space for video conferencing may at some point experience a condition that will lessen, degrade, or otherwise limit functionality of those components for use during a video conference. For example, it is possible that cameras, microphones, and/or speakers might fall out of position, become obstructed, or lose power, or that a computer or other hardware component might be using outdated software or firmware, or might be configured with user settings that are not suitable for the conference (e.g., a closed camera privacy shutter or a muted microphone). This may be particularly problematic when the components are shared between various participants across various video conferences. For example, in a classroom, a conference room, or other meeting room in which components are shared among participants, a participant may change a component in a way that limits functionality of the component for a next participant of a later video conference (e.g., by moving a camera, closing a camera privacy shutter, lowering the volume of a speaker, lowering the pick-up and/or sensitivity of a microphone, damaging the camera lens, or muting or otherwise disabling the microphone). Components being shared may also be susceptible to increased wear and tear, loss of battery power, disconnection of cables, and the like.

Implementations of this disclosure address problems such as these by automatically executing, by a processing system, diagnostic software to test the functionality of one or more components arranged in a physical space for use during a video conference before the conference begins. The diagnostic software may determine a configuration of a component and may compare the configuration to a parameter associated with the component to detect that the component is in a condition that limits the functionality of the component for use during a video conference. For example, executing the diagnostic software may include detecting whether hardware components, software components, and/or a combination thereof are in configurations that satisfy one or more parameters. A component having a configuration that does not satisfy a parameter may be detected to be in the condition that limits the functionality of the component. The configuration relates to functionality of the component (e.g., sound capturing for a microphone, sound playback for a speaker, video focusing and zooming for a camera, and ambient lighting for a lighting system), a position of the component (e.g., direction, orientation, and/or location of a camera or microphone), a user setting for the component (e.g., volume level of the speaker, lighting level of the lighting system, audio pick-up and/or sensitivity level of the microphone, microphone mute, and camera privacy shutter), a version of software or firmware used by the component (e.g., current or obsolete), or a service interval for the component (e.g., current or overdue). The one or more parameters may be stored in a data structure for reference when comparing to a configuration. A response may be initiated, based on an output of the diagnostic software, to change the condition of the component to increase the functionality of the component for use during the video conference. For example, the response may include, as applicable, a command for restarting the component (e.g., rebooting), restoring default settings of the component (e.g., from user settings), updating the software or the firmware of the component, sending a notification to participants and/or support personnel, and/or a communication with a reservation system to move the video conference to a different time and/or a different location with different components that are available for use. In some cases, the diagnostic software may verify that one or more of the components are not in the condition that limits functionality during the video conference (e.g., fully functional). A notification may be sent to a participant and/or support personnel indicating the verification (e.g., a green light for the video conference to proceed). In some implementations, a machine learning model may be used to determine one or more parameters for detecting that one or more of the components are in the condition that limits functionality. As a result, a video conference may proceed with a reduced likelihood of difficulty for participants due to issues involving the components.

To describe some implementations in greater detail, reference is first made to examples of hardware and software structures used to implement a system to execute diagnostic software to test the functionality of a component for use during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
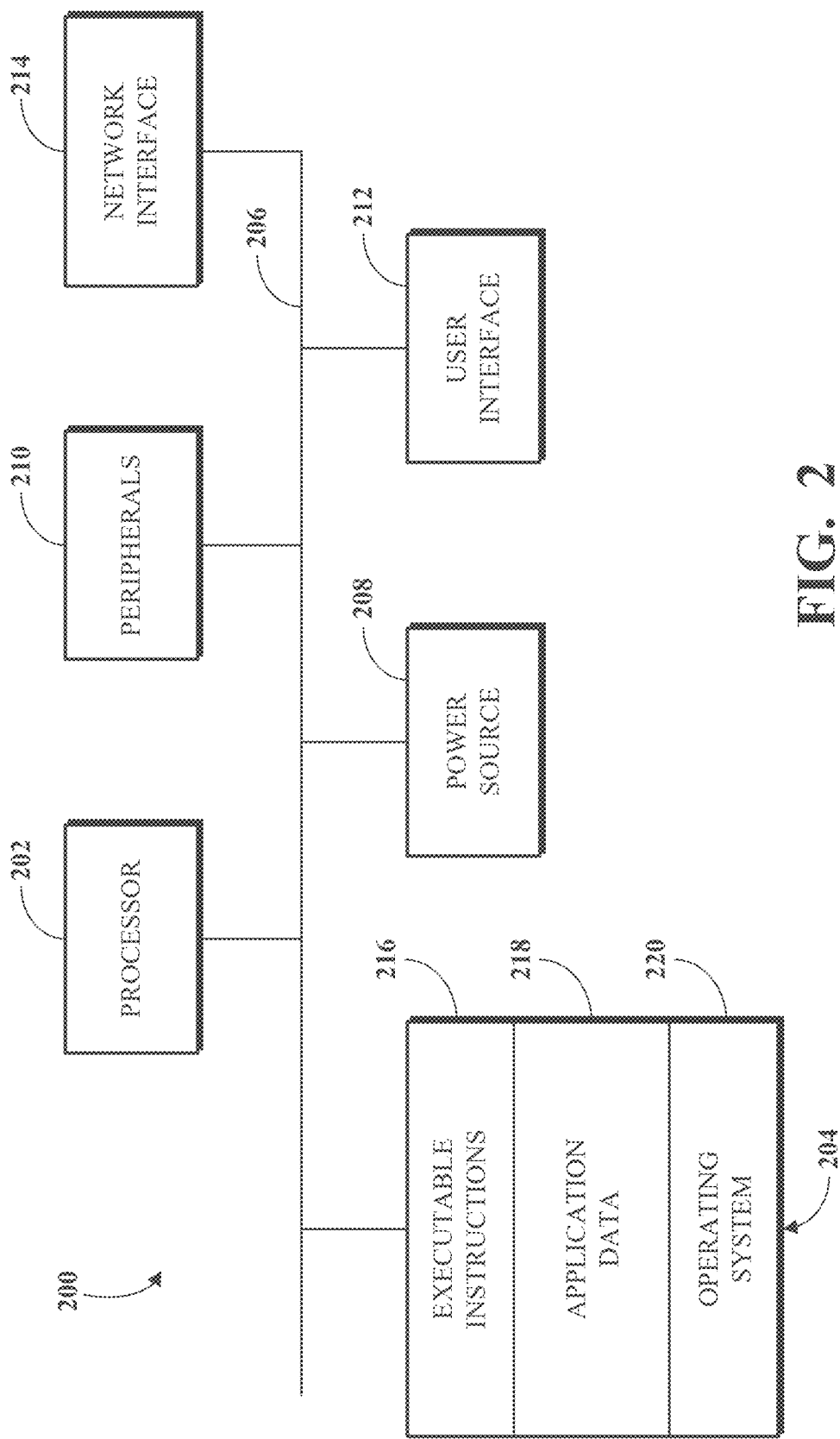
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
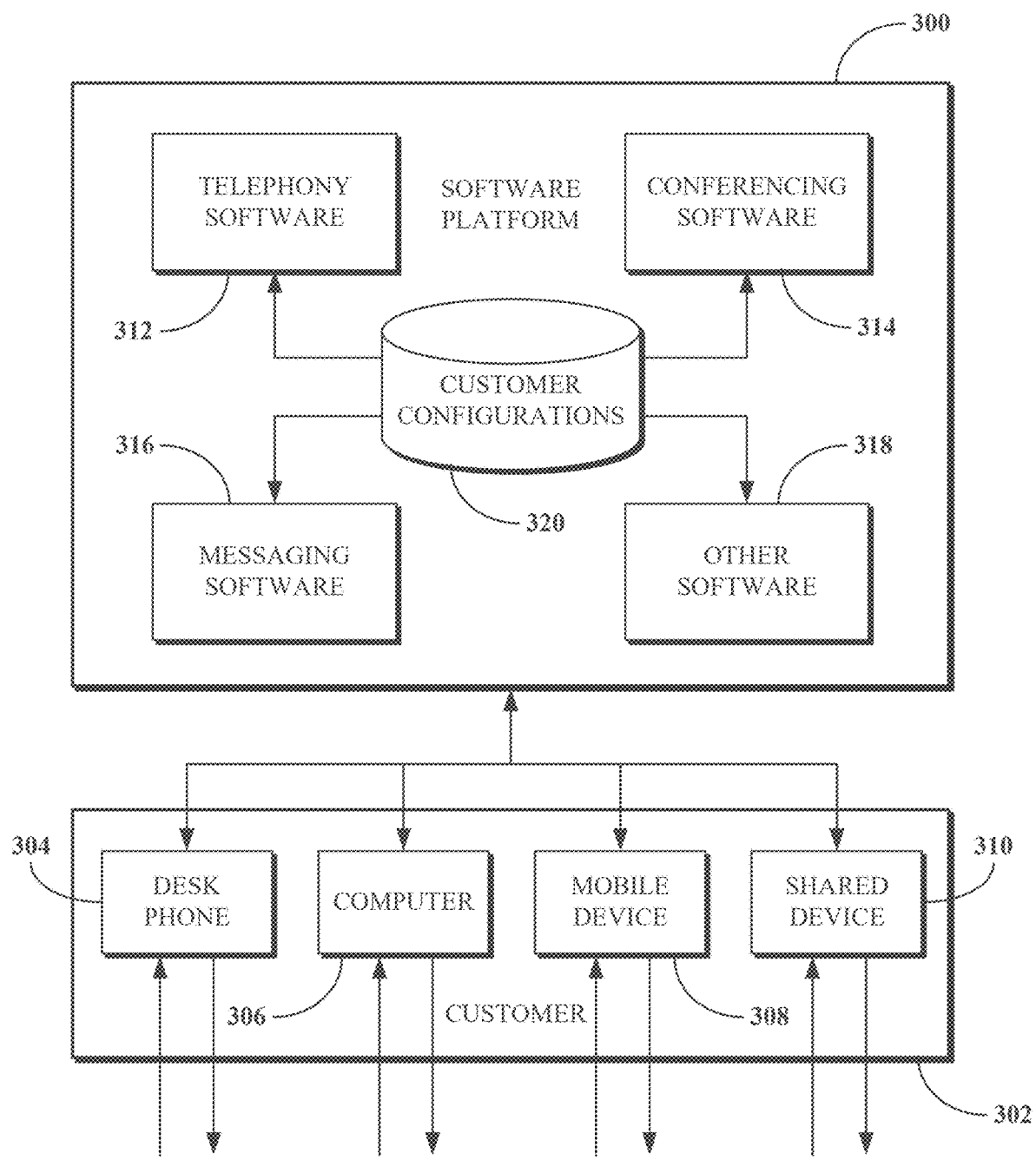
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for executing diagnostic software to test the functionality of a component for use during a video conference. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
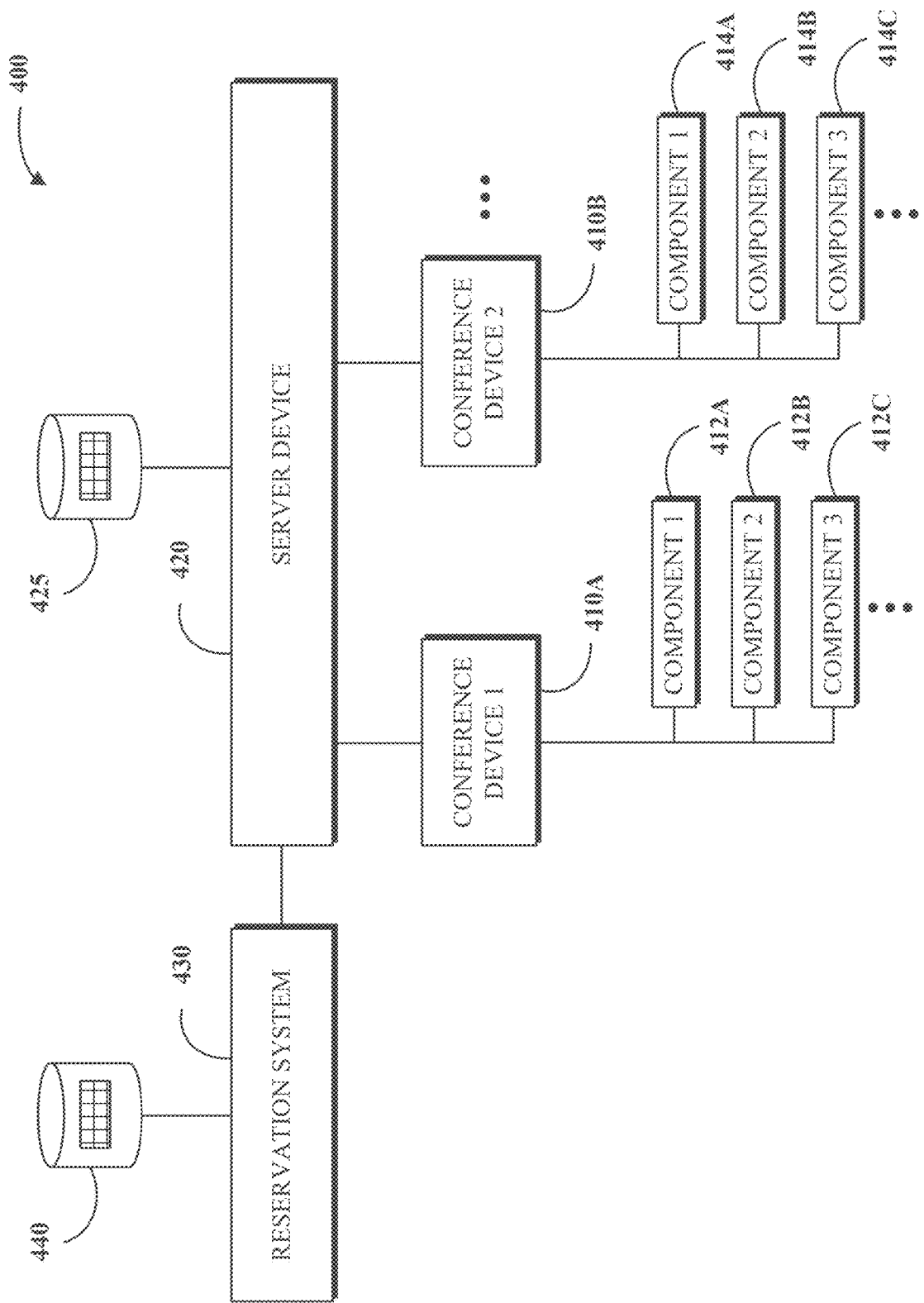
FIG. 4 is a block diagram of an example of a system for executing diagnostic software to test the functionality of components for use during a video conference.

FIG. 4 is a block diagram of an example of a system 400 for executing diagnostic software to test the functionality of components for use during a video conference. The system 400 may include one or more conference devices that can be used by participants, such as conference devices 410A and 410B. For example, a conference device could be a client device such as one of the clients 104A through 104D shown in FIG. 1 or 304 through 310 shown in FIG. 3. Thus, a conference device may be a processing system that includes at least a processor and a memory. A conference device could be operated by one or more users in a physical space (e.g., a classroom, a conference room, or other meeting room), and in some cases may be shared with other participants of other conferences at different times. The conference devices 410A and 410B may execute software (e.g., client-side conferencing software, which could, for example, be via a client application or a web application used to connect to a conference implemented using server-side software, such as the conferencing software 314 shown in FIG. 3) to connect to a server device 420. The server device 420 may execute software (e.g., server-side conferencing software, such as the conferencing software 314) to support a video conference between participants using the conference devices 410A and 410B. For example, the server device 420 could be a server at the datacenter 106 shown in FIG. 1. Thus, the server device 420 may also be a processing system that includes at least a processor and a memory. Although two conference devices 410A and 410B are shown, other numbers of conference devices may be used with the system 400.

During a video conference, a participant may use various hardware and software components associated with a conference device (e.g., the conference device 410A or 410B) to participate in the conference. For example, a participant using conference device 410A may use one or more of the components 412A through 412C associated with the conference device 410A, and a participant using conference device 410B may use one or more of the components 414A through 414C associated with the conference device 410B. The components may include hardware components, such as cameras, microphones, speakers, lights, input interfaces, output interfaces, digital whiteboards, and/or computers. The components may also include software components, such as video conferencing software, software or firmware controlling the functionality of hardware, and/or user settings. In some cases, the components may also include personal devices of the participants, such as smart phones, laptops, and tablets. For example, the components could include personal devices of the participants that are connected with conference devices, such as via Bluetooth pairing or other wireless protocol. The components may be provided in a physical space, such as the components 412A through 412C in a first physical space with the conference device 410A, and the components 414A through 414C in a second physical space with the conference device 410B. In some cases, the components, as with the conference devices, may be shared with other participants of other conferences at different times. For example, the components may be provided in a classroom, a conference room, or other meeting room and may be shared with other participants using the classroom, the conference room, or other meeting room at different times.

In some cases, one or more of the hardware and/or software components (e.g., the components 412A through 412C or 414A through 414C) used within the physical space for video conferencing may at some point experience a condition that will lessen, degrade, or otherwise limit functionality of those components for use during a video conference. For example, it is possible that cameras, microphones, and/or speakers might fall out of position, become obstructed, or lose power, or that a computer or other hardware component might be using outdated software or firmware, or might be configured with user settings that are not suitable for the conference (e.g., a closed camera privacy shutter or a muted microphone). This may be particularly problematic when the components are shared between various participants across various video conferences. For example, in a classroom, a conference room, or other meeting room in which components are shared among participants, a participant may change a component in a way that limits the functionality of the component for a next participant of a later video conference (e.g., by moving a camera, closing a camera privacy shutter, lowering the volume of a speaker, lowering the pick-up and/or sensitivity of a microphone, or muting or otherwise disabling the microphone). Components being shared may also be susceptible to increased wear and tear, loss of battery power, disconnection of cables, and the like.

To reduce disruption to the conference process, and/or to ensure functionality of components (e.g., the components 412A through 412C or 414A through 414C) for use by participants, a processing system (e.g., the conference device 410A, the conference device 410B, or the server device 420) may execute diagnostic software (e.g., client-side diagnostic software or server-side diagnostic software) to test the functionality of select components (e.g., one or more of the components 412A through 412C or 414A through 414C) for use during a video conference. In some implementations, the diagnostic software may execute automatically, and may execute periodically and/or at scheduled times. For example, the diagnostic software may be scheduled to execute before a conference begins.

When executed, the diagnostic software may determine configurations of components (e.g., the components 412A through 412C or 414A through 414C) by communicating with the components and/or by communicating with conference devices that are connected to, and communicate with, the components. For example, a conference device (e.g., the conference device 410A), executing the diagnostic software, may determine a configuration of a component (e.g., the component 412A) by communicating with the component. In another example, a server device (e.g., the server device 420), executing the diagnostic software, may determine a configuration of a component (e.g., the component 412A) by communicating with a conference device (e.g., the conference device 410A) that is connected to, and communicates with, the component. In some implementations, the configuration may relate to functionality of the component (e.g., sound capturing for a microphone, sound playback for a speaker, video focusing and zooming for a camera, and ambient lighting for a lighting system), a position of the component (e.g., direction, orientation, and/or location of a camera or microphone), a user setting for the component (e.g., volume level of the speaker, lighting level of the lighting system, audio pick-up and/or sensitivity level of the microphone, microphone mute, and camera privacy shutter), a version of software or firmware used by the component (e.g., current or obsolete), or a service interval for the component (e.g., current or overdue).

The diagnostic software may be executed to determine one or more parameters associated with a component. The parameters may be stored in a parameter data structure 425. For example, the parameter data structure 425 could be a data store that is accessible to the server device 420. The diagnostic software may be executed to compare the configurations of components to the parameters associated with the components to detect whether one or more components are in a condition that limits the functionality for use during the video conference. For example, executing the diagnostic software may permit detecting that hardware components, software components, and/or a combination thereof, may be in configurations that satisfy, or do not satisfy, parameters. A component having a configuration that does not satisfy a parameter may be detected to be in the condition that limits the functionality of the component.

A response may be initiated based on an output of the diagnostic software. For example, the output may indicate detection of the condition, as well as the type of condition that was detected, so that the response can be tailored to the condition. In some implementations, the response may be part of the diagnostic software. The response may be configured to change the condition (e.g., the limited functionality) of the one or more components (e.g., the components 412A through 412C or 414A through 414C) detected in the condition to increase the functionality for use during the video conference. In some implementations, the response may include a communication with the components and/or with conference devices connected to the components, as applicable, such as a command for restarting the component (e.g., rebooting), restoring default settings of the component (e.g., from user settings), and/or updating the software or firmware of the component. For example, the response from a conference device (e.g., the conference device 410A) may include the conference device sending a communication to the component (e.g., one of the components 412A through 412C). In another example, the response from a server device (e.g., the server device 420) may include the server device sending a communication to a conference device (e.g., the conference device 410A) that is connected to, and communicates with, the component (e.g., one of the components 412A through 412C). The communication may include a command to cause restarting the component, restoring the default settings, and/or updating the software or the firmware.

In some implementations, the response may include sending a notification to participants and/or support personnel. For example, the response may include an email, voicemail, text message, instant message, or chat message through a communications network, with or without communicating with the component (e.g., such as for restarting the component, restoring the default settings, or updating the software or the firmware). The notification may indicate that the diagnostic software has detected one or more components in the condition that limits the functionality for use during the video conference. In some implementations, the notification may include instructions to participants and/or support personnel about the component, such as to move the camera, the microphone, or the speaker back into position, open the privacy shutter on the camera, increase the lighting level, increase the volume of the speaker, increase the pick-up and/or sensitivity of the microphone, or un-mute the microphone. The notification may permit a participant to take an action, such as choosing to continue with the video conference as scheduled (e.g., accepting a limitation of the functionality of the component during the conference), changing the component for another, or rescheduling the conference to a different day, time, or physical location. The notification may also permit support personnel to take an action, such as servicing the component, changing the component, and/or rescheduling the conference to a different day, time, or physical location. In some cases, the notification may include a listing of one or more actions that were taken to resolve the condition, such as restarting the component, restoring the default settings, or updating the software or the firmware, and may include an indication of whether the action was successful or unsuccessful. This may save time for support personnel in trouble-shooting the problem.

In some implementations, the processing system may execute to determine a severity of the condition (e.g., a ranking), and to prioritize, based on the severity or the ranking, one component over another. This may permit, for example, prioritizing actions for support personnel, such as servicing a first component before servicing a second component. In some cases, the response may include a communication for scheduling service, with the support personnel, for a component detected in the condition.

In some cases, the diagnostic software may verify that one or more of the components are not in the condition that limits functionality of the component for use during the video conference (e.g., the diagnostic software may verify that one or more of the components are fully functional). A response may be initiated based on the verification. The response may include a notification to participants and/or support personnel indicating the verification (e.g., a green light for the video conference to proceed). For example, the response may include an email, voicemail, text message, instant message, or chat message through a communications network. This may give assurance to participants and/or support personnel.

In some implementations, the response may include a communication with a reservation system 430 via the server device 420. The reservation system 430 may indicate meeting information for the video conferences, such as a list of scheduled meetings, participants, physical locations, and resource requirements (e.g., a request for one or more microphones, one or more cameras, one or more digital whiteboards, or other components) for meetings scheduled to use conference devices. The meeting information may be specified in a physical resource data structure 440. For example, the physical resource data structure 440 could be a data store that is accessible to the reservation system 430. This may permit automatically determining whether a meeting with a component detected in the condition that limits functionality can continue as scheduled (e.g., the detected condition will not prevent the meeting or otherwise limit productivity) or should be rescheduled. This may also permit automatically rescheduling the conference, based on the meeting information, to a different day, time, or physical location, depending on the functionality that may be lost if the meeting were to continue as scheduled.

Moving the conference to a different location may permit using different components during the conference. For example, the components in the different location may be verified by the diagnostic software to be fully functional. The server device 420 may communicate with the reservation system 430 (e.g., a workspace reservations system and/or scheduling service) to determine the availability of physical locations having conference devices and components, and to reserve an alternate physical location for the conference based on availability. For example, the reservation system 430 could be implemented by a server at the datacenter 106 shown in FIG. 1 and/or by the server device 420. The reservation system 430 could execute reservation software (e.g., which may respond to calls from the server device 420) to determine the availability of physical locations having conference devices and components which may be specified in the physical resource data structure 440. For example, the physical resource data structure 440 may indicate that another physical location, having a conference device and fully functional components, is available for use as an alternative.

In some implementations, the response may include a communication with the reservation system 430 to obtain the meeting information, and using the meeting information to automatically determine a severity or a ranking of the condition. For example, the ranking may be used to prioritize responding to a first component that is detected in the condition over a second component that is detected in the condition. In some implementations, the response may include a communication for scheduling service for components detected in the condition, with available times (e.g., between scheduled meetings), based on the meeting information and the ranking.

By way of example, a component associated with conference device 410A, such as the component 412A, may be detected in a condition that limits functionality of the component for use during the video conference. For example, the component 412A could be a camera that has fallen out of position. Additionally, a component associated with conference device 410B, such as the component 414C, could also be detected in a condition that limits functionality of the component for use during the video conference. For example, the component 414C could be a computer using outdated software or firmware. The response may include obtaining meeting information associated with the conference devices 410A and 410B, and using the meeting information to automatically determine a severity or a ranking of the various conditions. For example, the ranking may prioritize resolving the condition for the component 412A (e.g., moving the camera back into position) above resolving the condition for the component 414C (e.g., updating the software or the firmware).

Figure 5:
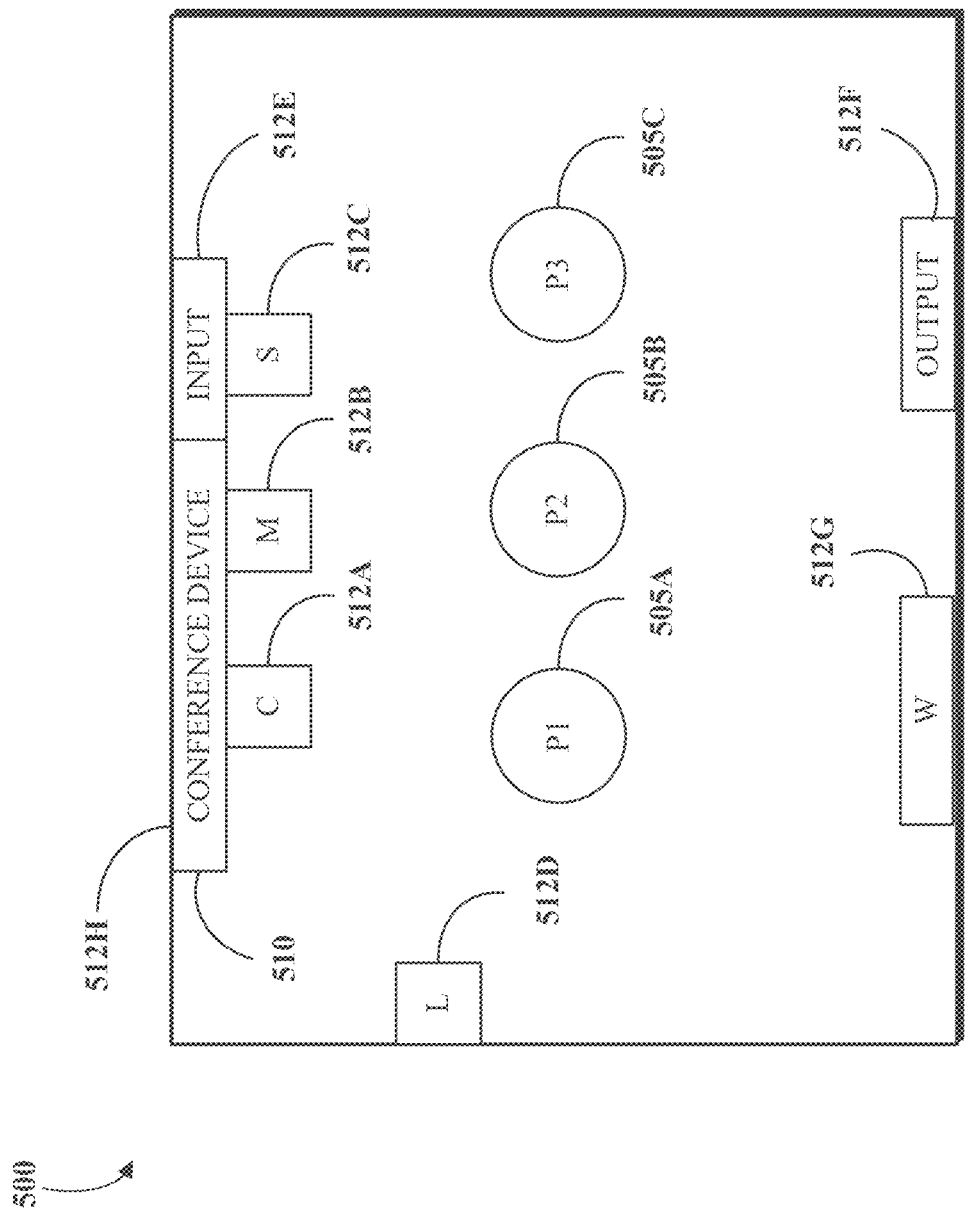
FIG. 5 is a block diagram of an example of a physical space including components for use during a video conference.

FIG. 5 is a block diagram of an example of a physical space 500 including components for use during a video conference. The physical space 500 could be a classroom, a conference room, or other meeting room in which components are shared among participants. In the physical space 500, one more participants, such as participants 505A, 505B, and 505C, may use a conference device 510 to execute software, such as client-side conferencing software and client-side diagnostic software. For example, the conference device 510 could be like the conference device 410A or 410B as shown in FIG. 4. The participants 505A, 505B, and 505C may use the conference device 510 to communicate with other participants during the video conference, such as via a server device like the server device 420 shown in FIG. 4.

The participants (e.g., the participants 505A, 505B, and 505C) in the physical space 500 may use various hardware and software components to participate in the conference. For example, the components may be like the components 412A through 412C or 414A through 414C shown in FIG. 4. The hardware components may be physically connected to the conference device 510 (e.g., via wired or wireless connections), and the software components may be virtually accessible by the conference device 510. For example, the hardware components may include a camera 512A, a microphone 512B, a speaker 512C, a lighting system 512D, an input interface 512E, an output interface 512F, a digital whiteboard 512G, and a computer 512H (e.g., which may implement the conference device 510). The hardware components may include controllers that control functionality of the components and that communicate with the conference device 510. For example, the lighting system 512D may include lights and a controller that controls the lights and communicates with the conference device 510. In another example, the software components may include video conferencing software (e.g., executing on the conference device 510), software or firmware controlling the functionality of hardware (e.g., software or firmware controlling the camera 512A, the microphone 512B, the speaker 512C, the lighting system 512D, the input interface 512E, the output interface 512F, the digital whiteboard 512G, and the computer 512H), and/or user settings controlling the functionality of hardware (e.g., user settings for the camera 512A, the microphone 512B, the speaker 512C, the lighting system 512D, the input interface 512E, the output interface 512F, the digital whiteboard 512G, and the computer 512H). The software components may include software interfaces that communicate with the conference device 510. In some implementations, the components may also include personal devices of the participants, such as smart phones, laptops, and tablets. In some implementations, the components may be shared with other participants of other conferences at different times.

In some cases, one or more of the hardware and/or software components used within the physical space for video conferencing may at some point experience a condition that will lessen, degrade, or otherwise limit functionality of those components for use during the video conference. For example, it is possible that camera 512A, the microphone 512B, and/or the speaker 512C might fall out of position, become obstructed, or lose power, or that the camera 512A, the microphone 512B, the speaker 512C, the lighting system 512D, the input interface 512E, the output interface 512F, the digital whiteboard 512G, or the computer 512H might be using outdated software or firmware, or might be configured with user settings that are not suitable for the conference (e.g., a closed camera privacy shutter or a muted microphone).

To reduce disruption to the conference process, and/or to ensure functionality of components, a processing system (e.g., the conference device 510, or a server device like the server device 420) may execute diagnostic software to test the functionality of one or more of the components. For example, the diagnostic software may test the functionality of the camera 512A, the microphone 512B, the speaker 512C, the lighting system 512D, the input interface 512E, the output interface 512F, the digital whiteboard 512G, the computer 512H, the video conferencing software (e.g., executing on the conference device 510), software or firmware controlling the functionality of the hardware, and/or user settings controlling the functionality of the hardware. The diagnostic software may test the functionality by determining a configuration of one or more of the components, such as by communicating with one or more of the components to read or detect the configuration. The diagnostic software may then compare the configuration to a parameter associated with the component (e.g., a parameter stored in a parameter data structure like the parameter data structure 425 shown in FIG. 4) to detect whether the component is in a condition that limits functionality for use during the video conference. In some cases, the diagnostic software may compare the configuration to the parameter to verify the component is not in the condition (e.g., the component is fully functional).

A response may be initiated based on an output of the diagnostic software, such as by the processing system executing the diagnostic software, to change the condition of the component, when detected in the condition, to increase the functionality of the component. For example, the response may include a command for restarting the camera 512A, the microphone 512B, the speaker 512C, the lighting system 512D, the input interface 512E, the output interface 512F, the digital whiteboard 512G, or the computer 512H. In another example, the response may include command for restoring default settings of the camera 512A, the microphone 512B, the speaker 512C, the lighting system 512D, the input interface 512E, the output interface 512F, the digital whiteboard 512G, the computer 512H, the video conferencing software, the software or the firmware controlling the functionality of the hardware (e.g., restoring from user settings). In another example, the response may include command for updating the software or the firmware of the camera 512A, the microphone 512B, the speaker 512C, the lighting system 512D, the input interface 512E, the output interface 512F, the digital whiteboard 512G, or the computer 512H, including the video conferencing software. In another example, the response may include a notification to participants (e.g., the participants 505A, 505B, and 505C) and/or support personnel. In another example, the response may include a communication with a reservation system (e.g., the reservation system 430) to move the video conference to a different time and/or a different location with different components that are available for use.

Figure 6:
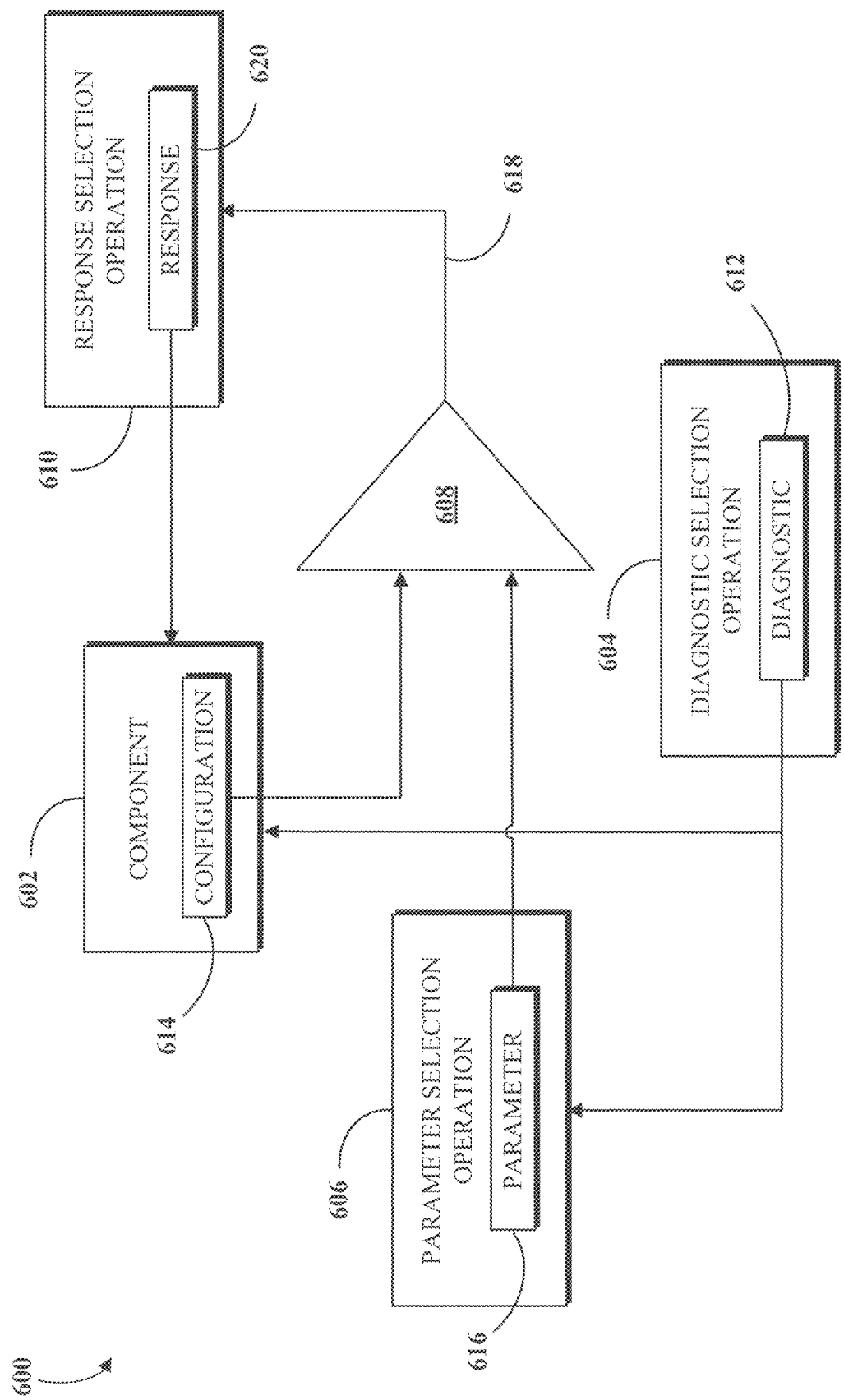
FIG. 6 is a block diagram of an example of a processing system executing diagnostic software to test the functionality of a component for use during a video conference.

FIG. 6 is a block diagram of an example of a processing system 600 executing diagnostic software to test the functionality of a component 602 for use during a video conference. The processing system (e.g., the conference device 410A or 410B or the server device 420 of FIG. 4, or the conference device 510 of FIG. 5) may implement hardware and/or software to execute the diagnostic software, such as implementing a diagnostic selection operation 604, a parameter selection operation 606, a compare operation 608, and a response selection operation 610. In some implementations, the processing system may execute the diagnostic software automatically, and may execute the diagnostic software periodically and/or at scheduled times. For example, the diagnostic software may be scheduled to execute before a conference begins.

The processing system may execute the diagnostic selection operation 604 to select diagnostic software 612 for testing. For example, the diagnostic selection operation 604 may select one or more diagnostics from a library. In some implementations, the diagnostic software 612 may comprise a test suite configured to test a particular component. For example, the diagnostic software 612 may be configured to test a camera, a microphone, a speaker, a lighting system, an input interface, an output interface, a digital whiteboard, a computer, video conferencing software, software or firmware controlling the functionality of hardware, and/or user settings controlling the functionality of hardware. In some implementations, the diagnostic software 612 may be automated to test the functionality of components (e.g., to ensure full functionality).

The processing system may communicate with the component 602. For example, the component 602 may be like one or more of the components 412A through 412C or 414A through 414C as shown in FIG. 4 or one or more of the components of FIG. 5. The processing system may communicate with the component 602, based on the diagnostic software 612 that is selected, to determine a configuration 614 of the component 602. For example, the processing system may communicate with the component 602 to read or detect the configuration 614 (e.g., reading register settings, user settings, or other values stored by the component 602, or detecting power, orientation, or angle of the component 602). The configuration 614 may relate to functionality of the component 602 (e.g., sound capturing for a microphone, sound playback for a speaker, video focusing and zooming for a camera, and ambient lighting for a lighting system), a position of the component 602 (e.g., direction, orientation, and/or location of a camera or microphone), a user setting for the component 602 (e.g., volume level of the speaker, lighting level of the lighting system, audio pick-up and/or sensitivity level of the microphone, microphone mute, and camera privacy shutter), a version of software or firmware used by the component 602 (e.g., current or obsolete), or a service interval for the component 602 (e.g., current or overdue). In some implementations, the processing system may communicate with the component 602 to cause the component 602 to execute a built-in self-test (BIST) (e.g., an automated test that permits a device to test itself). For example, the diagnostic software 612 may cause an automatic execution, before starting a video conference, of the BIST to determine to obtain the configuration 614.

The processing system may further execute the parameter selection operation 606 to select a parameter 616 for comparing with the configuration 614. For example, the processing system may communicate with a parameter data structure (e.g., like the parameter data structure 425) to select the parameter 616. The processing system may select the parameter 616 based on the diagnostic software 612 that is selected. The parameter 616 may be predetermined for a given component, such as a predetermined register setting, user setting, or other value expected to be stored by the component, or a predetermined power level or position that expected for the component. In some implementations, a machine learning model may be used to determine the parameter 616. For example, the machine learning model may learn the behaviors of participants using components during video conferences and may change parameters over time (e.g., such as the parameter 616) based on the behaviors.

The processing system may further execute the compare operation 608 to compare the configuration 614 to the parameter 616. The compare operation 608 may detect whether the configuration 614 satisfies, or does not satisfy, the parameter 616. A component 602 having a configuration 614 that does not satisfy the parameter 616 may be detected to be in a condition that limits the functionality of the component. A component 602 having a configuration 614 that does satisfy the parameter 616, or matches the parameter 616, may be detected to be verified for the video conference (e.g., not in the condition that limits the functionality of the component). For example, when the component 602 is a microphone, a camera, an input interface, or an output interface, the compare operation 608 may detect whether the configuration 614 of the microphone, the camera, the input interface, or the output interface satisfies, or does not satisfy the parameter 616. In some cases, the processing system may communicate with the component 602 to cause the component 602 to execute the BIST, before starting the video conference, to determine whether the configuration 614 of the component 602 satisfies the parameter 616.

The compare operation 608 may provide an output 618 to trigger the response selection operation 610. For example, the output 618 may indicate a determination that the configuration 614 of the component 602 does not satisfy the parameter 616, such as the software or the firmware being obsolete. The response selection operation 610 may initiate a response 620, based on the output 618, to change the condition of the component 602, including the configuration 614, such as to increase the functionality of the component for use during the video conference. For example, the response selection operation 610 may initiate the response 620, such as a command to restart the component 602 (e.g., reboot), restore default settings of the component 602 (e.g., from user settings), or update the software or the firmware of the component 602. In some implementations, the response selection operation 610 may communicate with a communications network to send a notification, such as an email, voicemail (transcribed), text message, instant message, or chat message. In some implementations, the response selection operation 610 may communicate with a reservation system (e.g., the reservation system 430) to move the video conference to a different time and/or a different location with a different component (e.g., a component that is a determined alternative to the component 602).

Figure 7:
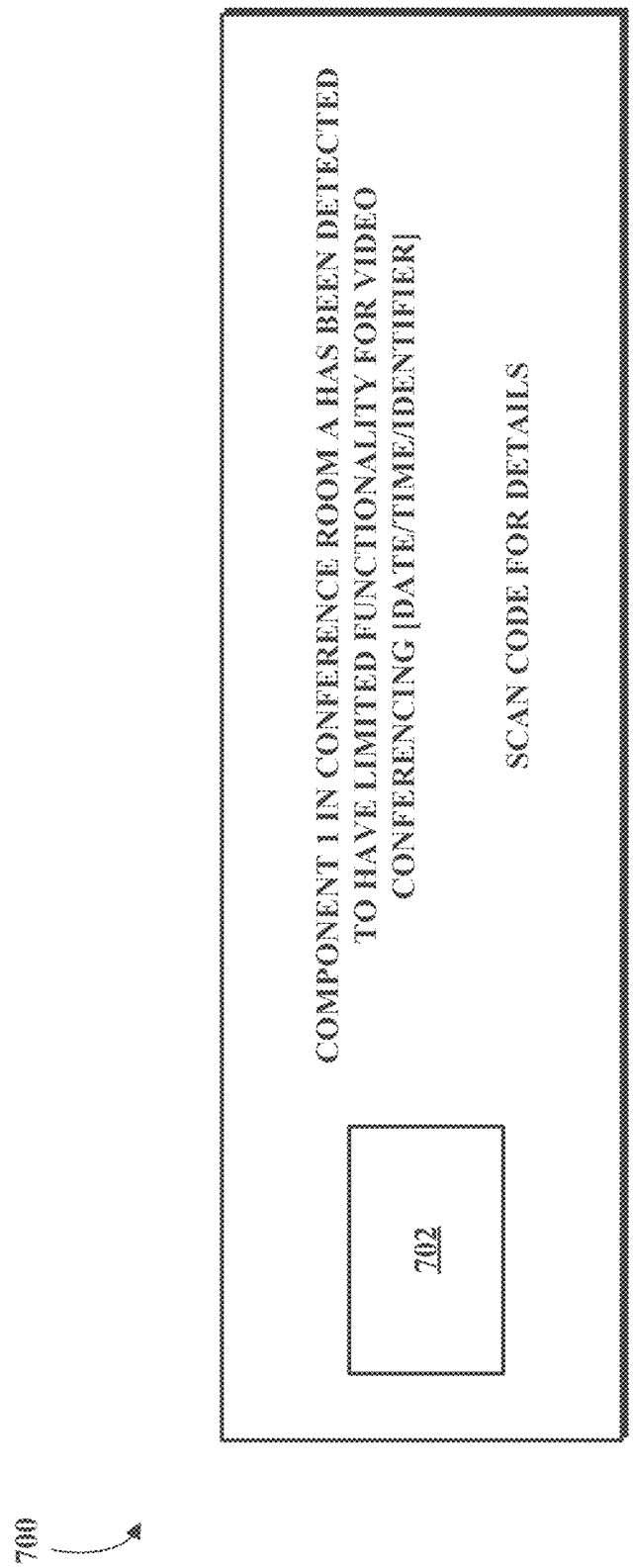
FIG. 7 is an illustration of an example of a graphical user interface (GUI) providing a notification that a component is detected in a condition that limits the functionality for use during the video conference.

FIG. 7 is an illustration of an example of a GUI 700 providing a notification that a component is detected in a condition that limits the functionality for use during a video conference. The GUI 700 could be output for display at an output interface like the user interface 212 shown in FIG. 2 or the output interface 512F shown in FIG. 5, to the extent different. In some implementations, the GUI 700 could be conveyed in connection with an email, voicemail (transcribed), text message, instant message, or chat message delivered through a communications network. The GUI 700 may be generated in response to detecting that one or more components (e.g., one or more of the components 412A through 412C or 414A through 414C) are in a condition that limits the functionality of the component for use during the video conference. For example, a processing system (e.g., the conference device 410A or 410B or the server device 420 of FIG. 4, or the conference device 510 of FIG. 5) may execute a response selection operation like the response selection operation 610 shown in FIG. 6 to generate the GUI 700. The response selection operation may include sending a notification like the notification provided in the GUI 700.

The notification may include an indication of one or more components that are detected to have limited functionality, and a date, time, and/or identifier corresponding to the detection (e.g., "Component 1 in Conference Room A has been detected to have limited functionality for video conferencing."). The notification may also include instructions, such as to move the camera, the microphone, or the speaker back into position, open the privacy shutter on the camera, increase the volume of the speaker, increase the pick-up and/or sensitivity of the microphone, or un-mute the microphone. In some implementations, the notification may include an indicium 702, such as quick response (QR) code, to permit participants and/or support personnel to obtain more information about the condition (e.g., the functionality that is limited). For example, a participant and/or support personnel may scan the QR code to obtain a detailed report related to the diagnostic and/or to obtain the instructions.

Figure 8:
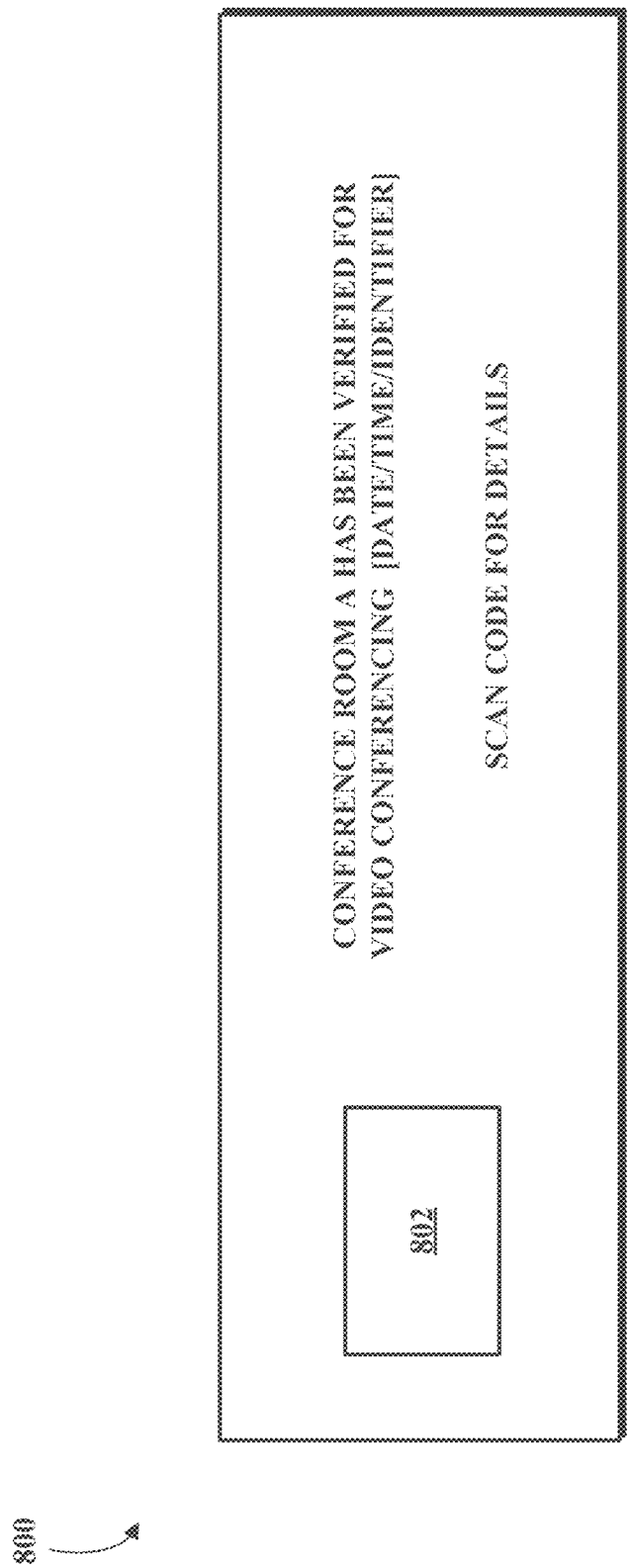
FIG. 8 is an illustration of an example of a GUI providing a notification comprising a verification of a component for use during the video conference.

FIG. 8 is an illustration of an example of a GUI 800 providing a notification comprising a verification of a component for use during a video conference. The GUI 800 could be output for display at an output interface like the user interface 212 shown in FIG. 2 or the output interface 512F shown in FIG. 5. In some implementations, the GUI 800 could be conveyed in connection with an email, voicemail (transcribed), text message, instant message, or chat message delivered through a communications network. The GUI 800 may be generated in response to verifying that one or more of the components (e.g., one or more of the components 412A through 412C or 414A through 414C) are not in the condition that limits functionality of the component for use during the video conference (e.g., fully functional). For example, a processing system (e.g., the conference device 410A or 410B or the server device 420 of FIG. 4, or the conference device 510 of FIG. 5) may execute a response selection operation like the response selection operation 610 shown in FIG. 6 to generate the GUI 800. The response selection operation may include sending a notification like the notification provided in the GUI 800.

The notification may include an indication of one or more components that are verified, and a date, time, and/or identifier corresponding to the verification (e.g., "Component 1 in Conference Room A has been verified for video conferencing," or when all components have been verified, simply "Conference Room A has been verified for video conferencing"). In some implementations, the notification may include an indicium 802, such as QR code, to permit participants and/or support personnel to obtain more information about the verification. For example, a participant and/or support personnel may scan the QR code to obtain a detailed report related to the diagnostic.

Figure 9:
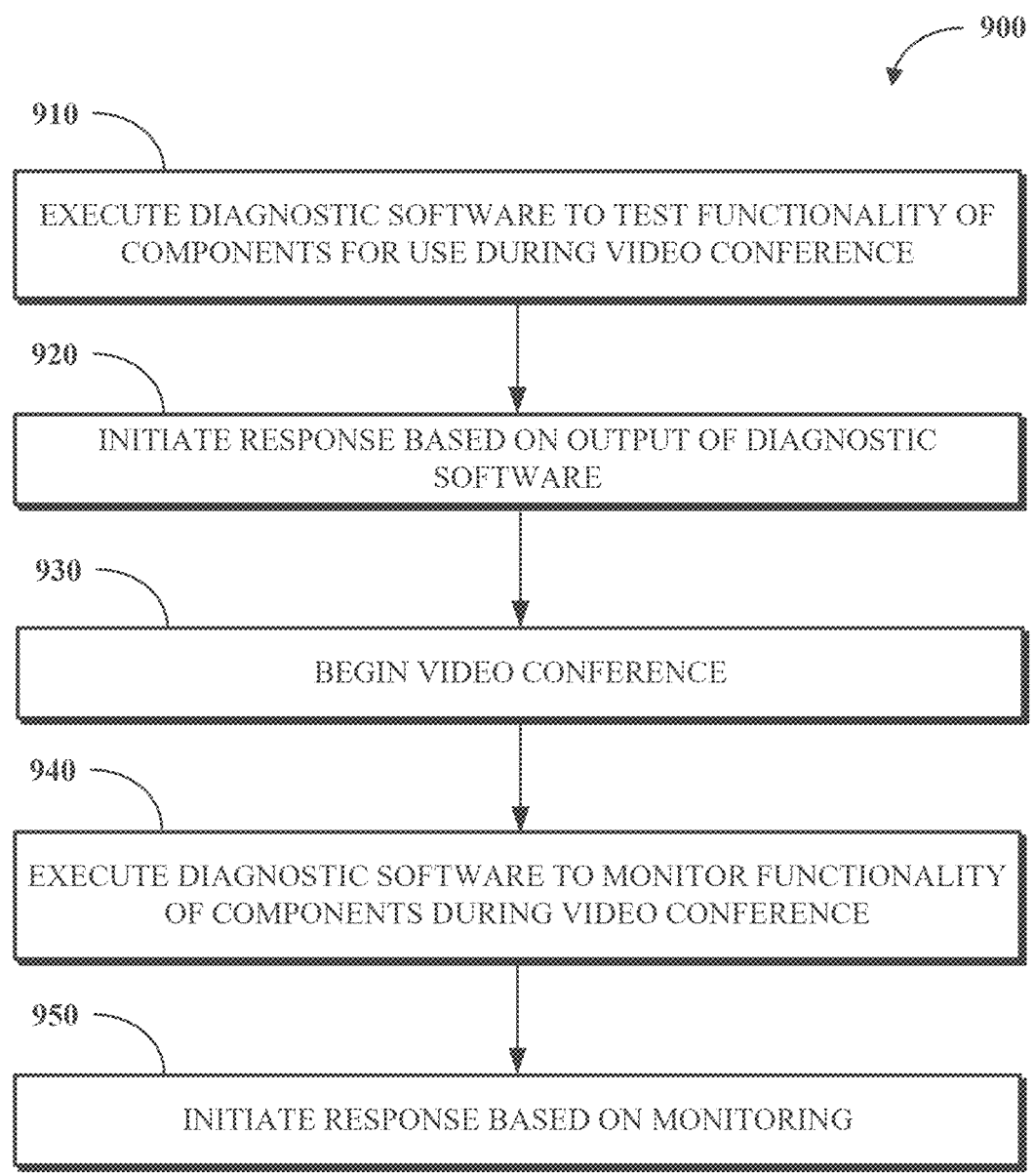
FIG. 9 is a flowchart of an example of a technique for executing diagnostic software to test the functionality of a component for use during a video conference.

To further describe some implementations in greater detail, reference is next made to examples of techniques which may be performed by or using a system that executes diagnostic software to test the functionality of a component for use during a video conference. FIG. 9 is a flowchart of an example of a technique 900 for executing diagnostic software to test the functionality of a component for use during a video conference. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 910, a processing system (e.g., the conference device 410A, the conference device 410B, or the server device 420) may execute diagnostic software to test the functionality of components (e.g., one or more of the components 412A through 412C or 414A through 414C) for use during a video conference. The processing system may execute diagnostic software (e.g., client-side diagnostic software or server-side diagnostic software) to run a diagnostic. In some implementations, the diagnostic may execute automatically, and in some cases, may execute periodically and/or at scheduled times. For example, the diagnostic may be scheduled to execute before a conference begins. When executed, the diagnostic may determine configurations of components by communicating with the components and/or by communicating with conference devices which communicate with the components. The configurations may relate to functionality of the components (e.g., sound capturing for a microphone, sound playback for a speaker, video focusing and zooming for a camera, and ambient lighting for a lighting system), positions of the component (e.g., direction, orientation, and/or location of a camera or microphone), user settings for the components (e.g., volume level of the speaker, lighting level of the lighting system, audio pick-up and/or sensitivity level of the microphone, microphone mute, and camera privacy shutter), versions of software or firmware used by the components (e.g., current or obsolete), or service intervals for the component (e.g., current or overdue). The diagnostic may determine parameters associated with the components. The parameters may be stored in a parameter data structure (e.g., the parameter data structure 425). The diagnostic may compare the configurations of components to the parameters associated with the components to detect whether components are in a condition that limits the functionality of the component for use during the video conference. For example, executing the diagnostic may include detecting whether hardware components, software components, and/or a combination thereof, are in configurations that satisfy, or do not satisfy, one or more parameters. A component having a configuration that does not satisfy a parameter may be detected to be in the condition that limits the functionality of the component. In some implementations, executing the diagnostic may include verifying the functionality of one or more components (e.g., verifying to be fully functional for video conferencing).

At 920, the processing system may initiate a response based on an output of the diagnostic software. In some implementations, the response may be part of the diagnostic. The response may be configured to change the condition (e.g., the limited functionality) of components detected in the condition to increase the functionality of the components for use during the video conference. In some implementations, the response may include a communication with the components and/or with conference devices connected to the components, such as a command for restarting the components (e.g., rebooting), restoring default settings of the components (e.g., from user settings), and/or updating the software or the firmware of the components. In some implementations, the response may include a notification to participants and/or support personnel. In some cases, the diagnostic software may verify that one or more of the components are not in the condition that limits functionality (e.g., fully functional), and initiating the response may include sending a notification to participants and/or support personnel indicating the verification (e.g., a green light for the video conference to proceed). In some implementations, initiating the response may include automatically communicating with a reservation system (e.g., the reservation system 430) for rescheduling the conference to a different day, time, or physical location.

At 930, the video conference may begin. For example, the processing system may execute conferencing software (e.g., client-side conferencing software associated with a conference device like one of the conference devices 410A through 410D, and/or server-side conferencing software associated with a server device like the server device 420) for the conference. Participants may communicate with one another via conference devices and server devices, like the conference devices 410A and 410B and the server device 420 as shown in FIG. 4. In some cases, the conference may begin in view of detecting the condition that limits the functionality of a component (e.g., despite the condition) and/or in view of verification of a component (e.g., assurance of being fully functional). Thus, a participant may choose to begin the conference, or may change components associated with the conference, based on the output of the diagnostic.

At 940, the processing system may execute the diagnostic software to monitor the functionality of components during the conference, such as periodically, randomly, or continuously executing the diagnostic software. For example, the processing system may execute the diagnostic software to test the functionality of components during the conference. When executed, the diagnostic software may determine configurations of components by communicating with the components and/or by communicating with conference devices that are connected to, and communicate with, the components, without interfering with the video conference. The diagnostic software may determine parameters associated with the components. The diagnostic software may compare the configurations of components to the parameters to detect whether components are in a condition that limits the functionality of the component. For example, executing the diagnostic software may include detecting whether hardware components, software components, and/or a combination thereof, are in configurations that satisfy, or do not satisfy, one or more parameters. A component having a configuration that does not satisfy a parameter may be detected to be in the condition that limits the functionality of the component.

At 950, the processing system may initiate a response, based on the monitoring, e.g., an output from the diagnostic software, to change the condition (e.g., the limited functionality) of one or more components to increase the functionality of the one or more components during the video conference. For example, the processing system may initiate the response during the conference. The response may be configured to change the condition (e.g., the limited functionality) of the one or more components to increase the functionality during the conference.

Figure 10:
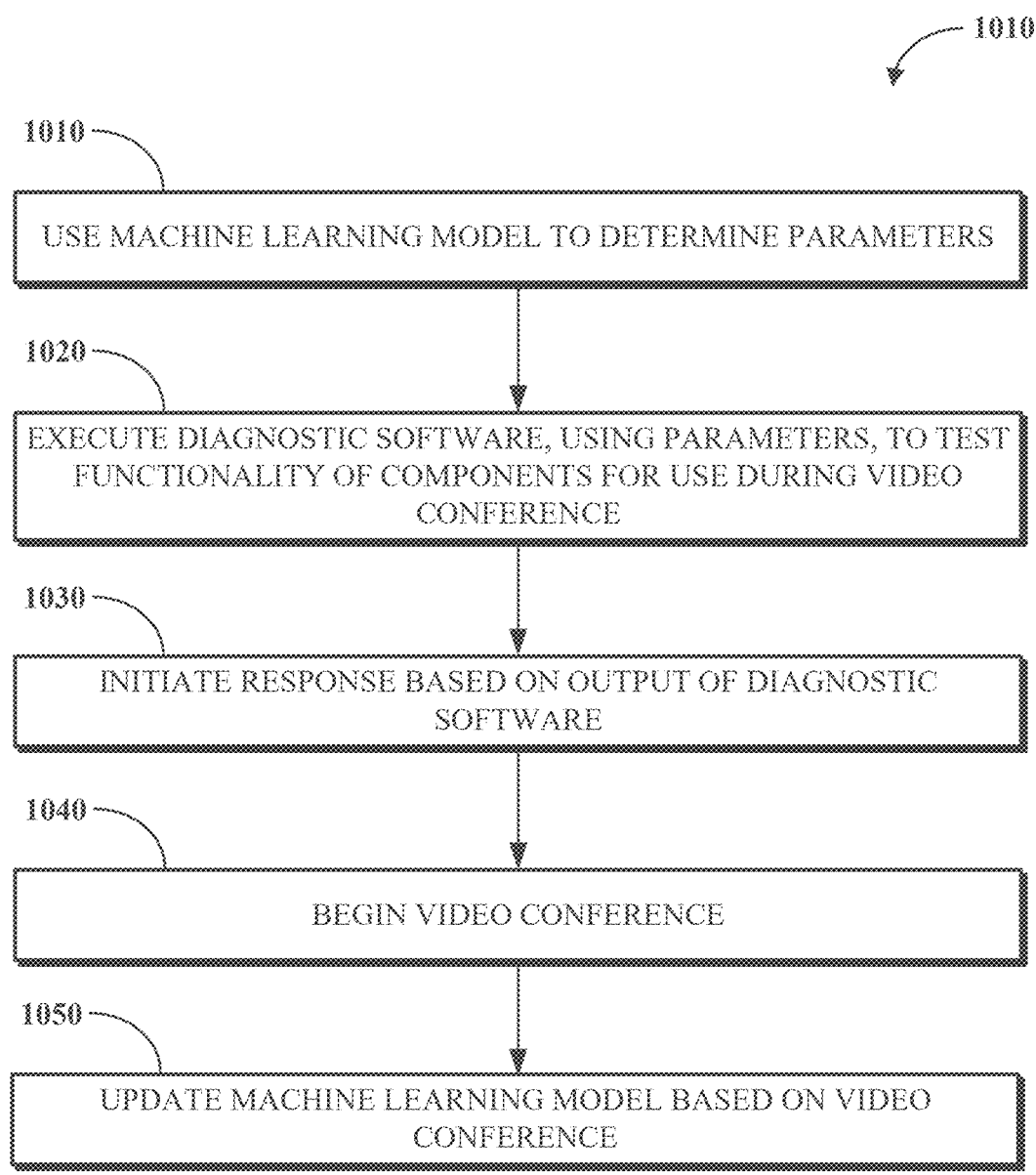
FIG. 10 is a flowchart of an example of a technique for using a machine learning model to execute diagnostic software to test the functionality of a component for use during a video conference.

To further describe some implementations in greater detail, reference is next made to examples of techniques which may be performed by or using a system that executes diagnostic software to test the functionality of a component for use during a video conference. FIG. 10 is a flowchart of an example of a technique 1000 for using a machine learning model to execute diagnostic software to test the functionality of a component for use during a video conference. The technique 1000 can be executed using computing devices, such as the systems, hardware, and software described with respect to FIGS. 1-8. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1010, a processing system (e.g., the conference device 410A, the conference device 410B, or the server device 420) may use the machine learning model to determine the parameters. The parameters may be used to detect that components (e.g., one or more of the components 412A through 412C or 414A through 414C) are in the condition that limits functionality during the video conference. The machine learning model may determine the parameters based on learning from previous video conferences. For example, the machine learning model may change the parameters from time to time, or adapt the parameters, based on previous video conferences. The machine learning model may maintain the parameters, as changed, in a parameter data structure (e.g., the parameter data structure 425).

At 1020, the processing system may execute diagnostic software to test the functionality of components for use during a video conference. The processing system may execute the diagnostic software (e.g., client-side diagnostic software or server-side diagnostic software) to run a diagnostic. In some implementations, the diagnostic software may execute automatically, and may execute periodically and/or at scheduled times. For example, the diagnostic software may be scheduled to execute before a conference begins. When executed, the diagnostic software may determine configurations of components by communicating with the components and/or by communicating with conference devices that are connected to, and communicate with, the components. The configurations may relate to functionality of the components (e.g., sound capturing for a microphone, sound playback for a speaker, video focusing and zooming for a camera, and ambient lighting for a lighting system), positions of the component (e.g., direction, orientation, and/or location of a camera or microphone), user settings for the components (e.g., volume level of the speaker, lighting level of the lighting system, audio pick-up and/or sensitivity level of the microphone, microphone mute, and camera privacy shutter), versions of software or firmware used by the components (e.g., current or obsolete), or service intervals for the component (e.g., current or overdue). The diagnostic software may reference the parameters determined by the machine learning model. The diagnostic software may compare the configurations of components to the parameters to detect whether components are in a condition that limits the functionality of the component for use during the video conference. For example, executing the diagnostic software may include detecting whether hardware components, software components, and/or a combination thereof, are in configurations that satisfy, or do not satisfy, one or more parameters. A component having a configuration that does not satisfy a parameter may be detected to be in the condition that limits the functionality of the component.

At 1030, the processing system may initiate a response based on an output of the diagnostic software. In some implementations, the response may be part of the diagnostic software. The response may be configured to change the condition (e.g., the limited functionality) of the components detected in the condition to increase the functionality of the components for use during the video conference. In some implementations, the response may include a communication with the components and/or with conference devices connected to the components, such as a command for restarting the components (e.g., rebooting), restoring default settings of the components (e.g., from user settings), and/or updating the software or the firmware of the components. In some implementations, the response may include a notification to participants and/or support personnel. In some cases, the diagnostic software may verify that one or more of the components are not in the condition that limits functionality of the component for use during the video conference (e.g., fully functional), and x the response may include a notification to participants and/or support personnel indicating the verification (e.g., a green light for the video conference to proceed). In some cases, the diagnostic software may verify that one or more of the components are not in the condition that limits functionality (e.g., fully functional), and the response may include a notification to participants and/or support personnel indicating the verification (e.g., a green light for the video conference to proceed). In some implementations, initiating the response may include automatically communicating with a reservation system (e.g., the reservation system 430) for rescheduling the conference to a different day, time, or physical location.

At 1040, the video conference may begin. For example, the processing system may execute conferencing software (e.g., client-side conferencing software associated with a conference device like one of the conference devices 410A through 410D, and/or server-side conferencing software associated with a server device like the server device 420) for the conference. Participants may communicate with one another via conference devices and server devices, like the conference devices 410A and 410B and the server device 420 as shown in FIG. 4. The conference may begin in view of detecting the condition that limits the functionality of a component and/or in view of verification of a component (e.g., fully functional). Thus, in some implementations, a participant may choose to begin the conference, or may change components associated with the conference, based on an output of the diagnostic software.

At 1050, the processing system may update the machine learning model based on the video conference. Updating the machine learning model may include changing the parameters, or adapting the parameters, based on the conference. For example, the machine learning model may learn behaviors of the participants using the components during the video conference. The machine learning model may change the parameters, based on the learning, in the parameter data structure. The changed parameters may be used when subsequently executing the diagnostic software, e.g., for a next diagnostic, to test the functionality of components for use during a video conference.

Some implementations may include a method that includes executing, by a processing system, diagnostic software to test the functionality of one or more components arranged in a physical space for use during a video conference, wherein functionality of the diagnostic software includes determining a configuration of a component of the one or more components and comparing the configuration to a parameter associated with the component to detect that the component is in a condition that limits the functionality of the component for use during the video conference; and initiating, by the processing system, a response, based on an output of the diagnostic software, to change the condition of the component to increase the functionality of the component. In some implementations, executing the diagnostic software causes an automatic execution, before starting the video conference, of a BIST associated with the component to determine that the configuration of the component satisfies the parameter. In some implementations, executing the diagnostic software causes a determination that the configuration of at least one of a microphone, a camera, an input interface, or an output interface does not satisfy the parameter. In some implementations, executing the diagnostic software causes a determination that software or firmware associated with the component is obsolete, and wherein the response includes an update of the software or the firmware of the component. In some implementations, the response includes a notification indicating the component is detected in the condition that limits the functionality of the component for use during the video conference. In some implementations, the response includes a communication with a reservation system to move the video conference to a different location having different components that are available for use during the video conference. In some implementations, the component is a first component, and the method includes verifying a second component is not in the condition that limits functionality for use during the video conference; and sending a notification indicating verification of the second component. In some implementations, the method includes using a machine learning model to determine the parameter for detecting that the component is in the condition that limits functionality of the component for use during the video conference.

Some implementations may include an apparatus that includes a memory; and a processor configured to execute instructions stored in the memory to: execute diagnostic software to test the functionality of one or more components arranged in a physical space for use during a video conference, wherein functionality of the diagnostic software includes determining a configuration of a component of the one or more components and comparing the configuration to a parameter associated with the component to detect that the component is in a condition that limits the functionality of the component for use during the video conference; and initiate a response, based on an output of the diagnostic software, to change the condition of the component to increase the functionality of the component. In some implementations, executing the diagnostic software causes an automatic execution, before starting the video conference, of a BIST associated with the component to determine that the configuration of the component satisfies the parameter. In some implementations, executing the diagnostic software causes a determination that software or firmware associated with the component is obsolete, and wherein the response includes an update the software or the firmware of the component. In some implementations, the response includes a notification indicating the component is detected in the condition that limits the functionality of the component for use during the video conference. In some implementations, the response includes a communication with a reservation system to move the video conference to a different location having different components that are available for use during the video conference. In some implementations, the component is a first component, and the processor is further configured to execute instructions stored in the memory to: verify a second component is not in the condition that limits functionality for use during the video conference; and send a notification indicating verification of the second component. In some implementations, the processor is further configured to execute instructions stored in the memory to: use a machine learning model to determine the parameter for detecting that the component is in the condition that limits functionality of the component for use during the video conference.

Some implementations may include a non-transitory computer readable medium storing instructions operable to cause one or more processors to perform operations including: executing, by a processing system, diagnostic software to test the functionality of one or more components arranged in a physical space for use during a video conference, wherein functionality of the diagnostic software includes determining a configuration of a component of the one or more components and comparing the configuration to a parameter associated with the component to detect that the component is in a condition that limits the functionality of the component for use during the video conference; and initiating, by the processing system, a response, based on an output of the diagnostic software, to change the condition of the component to increase the functionality of the component. In some implementations, executing the diagnostic software causes an automatic execution, before starting the video conference, of a BIST associated with the component to determine that the configuration of the component satisfies the parameter. In some implementations, the response includes a notification indicating the component is detected in the condition that limits the functionality of the component for use during the video conference. In some implementations, the response includes a communication with a reservation system to move the video conference to a different location having different components that are available for use during the video conference. In some implementations, the operations further include using a machine learning model to determine the parameter for detecting that the component is in the condition that limits functionality of the component for use during the video conference.

An implementation may include a method that includes obtaining meeting information that indicates one or more components arranged in a physical space of a video conference. The method may include executing diagnostic software via a conference device of the video conference to detect, based on the meeting information, that a component of the one or more components is in a limited condition for use during the video conference.

An implementation may include an apparatus that comprises a memory and a processor. The processor may be configured to execute instructions stored in the memory to obtain meeting information that indicates one or more components arranged in a physical space of a video conference. The processor may be configured to execute instructions stored in the memory to execute diagnostic software via a conference device of the video conference to detect, based on the meeting information, that a component of the one or more components is in a limited condition for use during the video conference.

An implementation may include a non-transitory computer-readable medium storing instructions operable to cause one or more processors to perform operations. The operations may include obtaining meeting information that indicates one or more components arranged in a physical space of a video conference. The operations may include executing diagnostic software via a conference device of the video conference to detect, based on the meeting information, that a component of the one or more components is in a limited condition for use during the video conference.

In one or more implementations, a configuration of the component may be determined. In one or more implementations, the configuration may be compared to a parameter associated with the component. In one or more implementations, a response may be initiated to increase functionality of the component. In one or more implementations, executing the diagnostic software may cause an automatic execution of a BIST associated with the component. In one or more implementations, executing the diagnostic software may cause a determination that a configuration of at least one of a microphone, a camera, an input interface, or an output interface does not satisfy a parameter. In one or more implementations, executing the diagnostic software may cause a determination that software or firmware associated with the component is obsolete. In one or more implementations, a response that includes a software update or a firmware update of the component may be initiated. In one or more implementations, a response that includes a notification that indicates that the component is detected in the limited condition may be initiated. In one or more implementations, a response may be initiated that includes a communication with a reservation system to move the video conference to a different location that has different components that are available for use during the video conference. In one or more implementations, it may be verified that a second component is not in the limited condition. In one or more implementations, a notification may be sent that indicates verification of the second component. In one or more implementations, a machine learning model may be used to determine a parameter to detect that the component is in a limited condition. In one or more implementations, the diagnostic software may be executed to cause an automatic execution, before starting the video conference, of a BIST associated with the component to determine that a configuration of the component satisfies a parameter. In one or more implementations, a configuration of the component may be determined. In one or more implementations, the configuration may be compared to a parameter associated with the component. In one or more implementations, a response may be initiated that includes a communication with a reservation system to move the video conference to a different location that has different components that are available for use during the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   obtaining meeting information that indicates one or more components arranged in a physical space of a video conference;
   determining a configuration of a first component and comparing the configuration with a parameter that is adaptively updated by a machine learning model;
   executing a built-in self-test (BIST), prior to a start of the video conference, to determine whether the configuration of the first component satisfies the parameter; and
   executing diagnostic software via a conference device of the video conference to detect, based on the comparing, that the first component is in a limited condition for use during the video conference, wherein executing the diagnostic software causes a determination that software or firmware associated with the first component is obsolete, the method further comprising:
   initiating a response that includes a software update or a firmware update of the first component.

2. The method of claim 1, wherein the response includes a communication with a reservation system to move the video conference to a different location.

3. The method of claim 2, wherein the different location has different components that are available for use during the video conference.

4. The method of claim 1, further comprising:
   initiating the response to increase functionality of the first component responsive to detection of the limited condition.

5. The method of claim 1, further comprising:
   initiating a verification that a second component is not in the limited condition.

6. The method of claim 5, further comprising:
transmitting a notification indicating the verification of the second component.

7. The method of claim 1, wherein executing the diagnostic software causes a determination that a configuration of at least one of a microphone, a camera, an input interface, or an output interface does not satisfy the parameter.

8. An apparatus, comprising:
a memory; and
a processor configured to execute instructions stored in the memory to:
obtain meeting information that indicates one or more components arranged in a physical space of a video conference;
determine a configuration of a first component and compare the configuration with a parameter that is adaptively updated by a machine learning model;
execute a built-in self-test (BIST), prior to a start of the video conference, to determine whether the configuration of the first component satisfies the parameter; and
execute diagnostic software via a conference device of the video conference to detect that the first component is in a limited condition for use during the video conference, wherein the execution of the diagnostic software causes a determination that software or firmware associated with the first component is obsolete, the processor further configured to:
initiate a response that includes a software update or a firmware update of the first component.

9. The apparatus of claim 8, wherein the processor is further configured to:
initiate a response that includes a notification that indicates that the first component is detected in the limited condition.

10. The apparatus of claim 8, wherein the processor is further configured to:
initiate a response that includes a communication with a reservation system to move the video conference to a different location that has different components that are available for use during the video conference.

11. The apparatus of claim 8, wherein the component is a first component, and the processor is further configured to:
verify that a second component is not in the limited condition.

12. The apparatus of claim 11, wherein the processor is further configured to:
transmit a notification that indicates a verification of the second component.

13. The apparatus of claim 8, wherein the processor is configured to provide an output to trigger a response selection.

14. The apparatus of claim 8, wherein the processor is configured to determine that a configuration of at least one of a microphone, a camera, an input interface, or an output interface does not satisfy the parameter.

15. A non-transitory computer-readable medium storing instructions operable to cause one or more processors to perform operations comprising:
obtaining meeting information that indicates one or more components arranged in a physical space of a video conference;
determining a configuration of a first component and comparing the configuration with a parameter that is adaptively updated by a machine learning model;
executing a built-in self-test (BIST), prior to a start of the video conference, to determine whether the configuration of the first component satisfies the parameter; and
executing diagnostic software via a conference device of the video conference to detect, based on the comparing, that the first component is in a limited condition for use during the video conference, wherein executing the diagnostic software causes a determination that software or firmware associated with the first component is obsolete, the operations further comprising:
initiating a response that includes a software update or a firmware update of the first component.

16. The non-transitory computer-readable medium of claim 15, wherein the response includes a communication with a reservation system to move the video conference to a different location.

17. The non-transitory computer-readable medium of claim 16, wherein the different location has different components that are available for use during the video conference.

18. The non-transitory computer-readable medium of claim 16, wherein the response includes a notification that indicates that the first component is detected in the limited condition.

19. The non-transitory computer-readable medium of claim 16, wherein the operations further comprise:
initiating the response to increase functionality of the first component responsive to detection of the limited condition.

20. The non-transitory computer-readable medium of claim 16, wherein the operations further comprise:
initiating a verification that a second component is not in the limited condition.

* * * * *